United States Patent [19]

Sasaki et al.

[11] 4,217,335

[45] Aug. 12, 1980

[54] PROCESS FOR PRODUCING β-SILICON CARBIDE FINE POWDER

[75] Inventors: Tadao Sasaki, Takarazuka; Isamu Komaru, Ashiya; Ryuzo Yoshioka, Nara, all of Japan

[73] Assignee: Nippon Crucible Co., Ltd., Tokyo, Japan

[21] Appl. No.: 48,563

[22] Filed: Jun. 14, 1979

[51] Int. Cl.$^2$ .............................................. C01B 31/36
[52] U.S. Cl. ....................................... 423/345; 106/44
[58] Field of Search ........................... 423/345; 106/44

[56] References Cited

U.S. PATENT DOCUMENTS

| | | | |
|---|---|---|---|
| 2,032,077 | 2/1936 | Thompson | 423/345 |
| 3,271,109 | 9/1966 | Mezey et al. | 423/345 |
| 3,438,729 | 4/1969 | Ohlgren | 106/44 |
| 4,117,096 | 9/1978 | Hosaka et al. | 423/345 |

FOREIGN PATENT DOCUMENTS

| | | | |
|---|---|---|---|
| 2452799 | 5/1975 | Fed. Rep. of Germany | 423/345 |
| 47-2433 | 1/1972 | Japan | 423/345 |
| 50-18479 | 6/1975 | Japan | 423/345 |

*Primary Examiner*—Jack Cooper
*Attorney, Agent, or Firm*—Sughrue, Rothwell, Mion, Zinn and Macpeak

[57] ABSTRACT

A process for producing a β-silicon carbidé powder is disclosed wherein a ternary mixture of carbon, silicon and silica powders mixed in amounts falling within the region defined by the points O, P, Q and R in the FIGURE are reacted in an oxidizing atmosphere.

7 Claims, 1 Drawing Figure

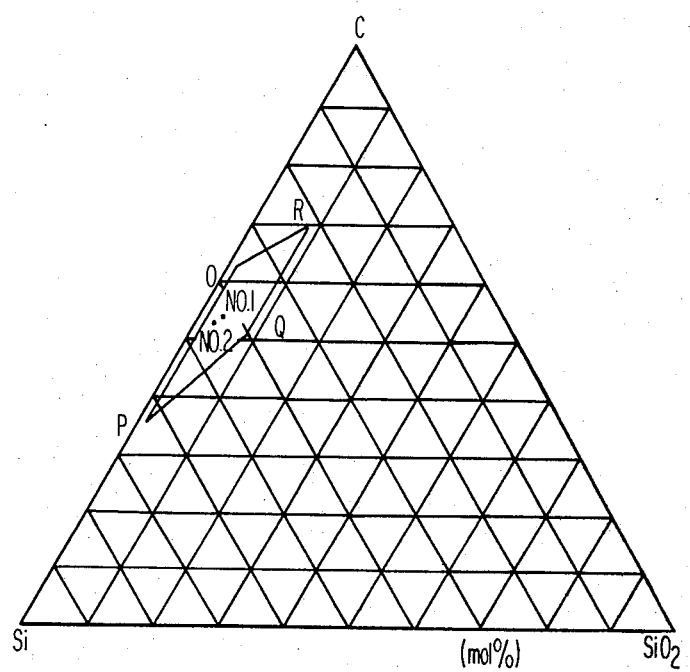

PROCESS FOR PRODUCING β-SILICON CARBIDE FINE POWDER

BACKGROUND OF THE INVENTION

1. Field of the Invention

The present invention relates to a process for producing a β-silicon carbide fine powder.

2. Description of the Prior Art

Silicon carbide, which is very hard and has excellent properties such as resistance to oxidation, resistance to corrosion, resistance to spalling, hot strength, etc., finds a wide range of applications including in heat refractory industrial materials, but especially in applications such as lapping materials, pigments, matrix materials for heat refractory products, sintered silicon carbide, etc. There is a demand for a fine powder and a highly active silicon carbide. β-Silicon carbide is called "low temperature" type silicon carbide based on its transition temperature and it is useful because it is a fine powder and is highly active as compared with α-silicon carbide, but various difficulties accompany its production.

That is, although some processes for producing β-silicon carbide fine powder have been disclosed in, for example, British Pat. No. 1,199,953, Japanese Patent Application (OPI) Nos. 75600/75 and 37898/76, such prior art processes require, in addition to the complicated preparation of raw materials, an oxygen-free atmosphere when heating, high temperatures exceeding 1,450° C. and an extended heating time to produce β-silicon carbide in high quality and high yield. Accordingly, the prior art manufacture is highly restricted. It requires inefficient, unproductive and uneconomical special equipment such as a high temperature variable atmosphere oven, thus making β-silicon carbide fine powder far less available and its commercial applications therefore limited.

As a process to greatly relax the restrictions on the above prior art processes, the applicants have recently been presented U.S. Pat. No. 4,117,096 directed to a new process for the mass production of high purity β-silicon carbide by heating metallic silicon powder and carbon powder in an oxidizing atmosphere to induce a spontaneous chain reaction. Even with this process, however, and especially when a minute particle size on the order of submicrons is desired, it is necessary to reduce the packing density of the mixture of raw materials charged to a refractory reactor or to thoroughly pulverize the reaction product. The reduction in packing density inevitably leads to less productivity whereas the pulverization of the reaction product not only wastes more energy as the desired particle size becomes smaller but also increases abrasion of the pulverizer at the same time causing deterioration of the powder quality of the product.

SUMMARY OF THE INVENTION

An object of the present invention is to provide a process for producing high purity β-silicon carbide fine powder of better powder quality and higher activity more easily without sacrificing the features and advantages of our previously applied process by mixing carbon, slicon and silica in amounts that each component expressed as mol% falls into a specified region.

Accordingly, the present invention resides in a process for producing β-silicon carbide fine powder which comprises mixing carbon powder having a particle size of about 20 μm or less, metallic silicon powder and silica powder in amounts such that each component expressed as mol% falls into an area defined by the lines connecting the points O (C: 62.4, Si: 37.4, SiO$_2$: 0.2), P (C: 34.9, Si: 64.9, SiO$_2$: 0.2), Q (C: 50, Si: 41, SiO$_2$: 9) and R (C: 68, Si: 23, SiO$_2$: 9) in a ternary system of carbon, silicon and silica as shown in the FIG. filling the mixture in a heat refractory reactor and heating it in an oxidizing atmosphere having an oxygen content of about 0.3 to 35% by volume to a temperature of about 800 to 1,450° C. To induce a spontaneous chain reaction.

BRIEF DESCRIPTION OF THE FIGURE

The FIG. is a ternary diagram of carbon, silicon and silica amounts in mol% suitably used in the present invention.

DETAILED DESCRIPTION OF THE INVENTION

When silica is mixed with carbon and heated to an elevated temperature, the reaction proceeds to produce silicon carbide as follows:

$$SiO_2 + 3C \rightarrow SiC + 2CO - 144.4 \text{ kcal/mol}$$

Since the reaction is endothermic, a considerable amount of thermal energy is required to complete the reaction. The essential point of the present invention is to mix carbon, silicon and silica which is a component for the endothermic reaction, and then to heat the resulting mixture in an oxidizing atmosphere.

When a mixture of carbon powder, metallic silicon powder and silica powder is heated in an oxidizing atmosphere, although the details of the reaction mechanism are not fully understood, probably oxygen and some component of the raw material mixture react to produce an intermediate which then functions as a catalyst to initiate the reaction of a part of the carbon-silicon system, and the reaction in turn triggers a chain reaction in a surprisingly low temperature region to quickly (within about a minute to two) complete the silicon carbide formation in the ternary system. This reaction which begins at a low temperature, rapidly proceeds and completes in a short time as above is herein referred to as a "spontaneous chain reaction".

In this spontaneous chain reaction, the oxidizing properties of the atmosphere will not deteriorate the quality of the product since neither the raw materials nor the reaction product are subject to high temperatures for an extended time.

Another important feature of this invention is that silica powder added as a raw material not only participates in the production of silicon carbide in the course of the spontaneous chain reaction but also inhibits the formation of coarse silicon carbide particles, although the details of the mechanism have not been explained as yet. Consequently, in accordance with the process of the present invention, the particle size can be controlled to avoid coarse particles even when increasing the packing density of the raw materials, thus minute and active silicon carbide fine powder can be easily obtained without sacrificing productivity or adding the special pulverizing process as mentioned above. Thus, the gist of the present invention is the specific function of controlling the particle size of the reaction product by adding silica powder to carbon powder and metallic silicon powder in the production of β-silicon carbide.

In the process of the present invention, the particle size of the carbon raw material must be about 20 μm or less and is preferably about 0.005 to 5 μm otherwise the spontaneous chain reaction will not be induced and consequently most of the mixture of the raw materials or at least a part of the carbon particles will remain unreacted. In practice, the particle size of the carbon raw material may be selected from this range depending upon the application of the β-silicon carbide. For example, a carbon raw material having as small a particle size as possible must be chosen in order to obtain highly active minute products.

Once the spontaneous chain reaction begins, the temperature of the mixture suddenly increases by the generation of heat of reaction and a part of the metallic silicon powder melts or gasifies to take part in the reaction with the carbon and the interaction with the silica, thus the particle size of the silicon can be somewhat larger than the carbon up to about 200 μm at the maximum and preferably up to 100 μm.

The silica desirably has a particle size of about 100 μm or less, preferably about 20 μm or less. If it is larger than this, its ability to inhibit the formation of coarse silicon carbide will be greatly reduced, the progress of the spontaneous chain reaction will be retarded, and further a part of the silica will remain unreacted.

The nature of the raw materials can vary widely if the above requirements on the particle sizes are satisfied. Examples of the carbon raw material include commonly available carbonaceous materials such as natural graphite, synthetic graphite, coke, undried coke, carbon black, coal pitch, petroleum pitch and the like. The carbonaceous materials sould not contain more than 30% by weight ash.

The silicon raw material can also be chosen from a wide range of materials, e.g., from semiconductor grades to ordinary technical grades but should have a silicon content of 90% or more.

As the silica raw material, silica stone or silica sand both found naturally can be used after grinding, which is rather difficult. However, it is preferred to use, e.g., amorphous silica powders obtained as by-products from the production of ferrosilicons, phosphate fertilizers, etc., silica fine powders commonly referred to as white carbon such as Aerosil synthesized by the oxidative decomposition of silicon tetrachloride, etc.

The purity of each component, although its influence on the spontaneous chain reaction is not remarkable, affects the purity and the particle size of the product and thus can be appropriately chosen according to the purpose of the product.

Turning now to the mixing ratio of carbon, silicon and silica raw materials, the spontaneous chain reaction is essential to the present invention, thus, the mixing ratio depends on the particle size of each raw material, the mixing conditions, the size of a batch of the mixture, the heat-up rate and temperature, the oxygen content of the atmosphere, etc., and it has to be taken into account that a part of the carbon as well as silicon and silica escape alone or in the form of gaseous carbon monoxide, silicon monoxide, etc., by the interaction between them. Thus, in the present invention, it is difficult to calculate the mixing ratio of the raw materials stoichiometrically and they have been determined empirically based on numerous experiments. That is, the mixing ratio is preferably such that each component expressed as mol% falls inside the region defined by a tetragon OPQR in the FIG. (i.e., not on the tetragon).

The FIG. is a triangular diagram of carbon-silicon-silica ternary system showing the preferred region defined by the tetragon OPQR for the mixing ratio, in which O, P, Q and R represent the following compositions, respectively, in mol%.

O: C 62.4, Si 37.4, $SiO_2$ 0.2
P: C 34.9, Si 64.9, $SiO_2$ 0.2
Q: C 50, Si 41, $SiO_2$ 9
R: C 68, Si 23, $SiO_2$ 9

In the region on and above Line OR, a great amount of carbon remains mostly unreacted, and in the region on and below Line PQ, the metallic silicon alone is sintered first and does not cause the spontaneous chain reaction (i.e., the desired reaction) or even if it reacts, a large amount of sintered metallic silicon would be present, thus interfering with the pulverization of the product after the reaction.

In the region to the right of Line QR (the line inclusive), the endothermic reaction of silica and carbon predominates and accordingly it becomes difficult to bring about the spontaneous chain reaction. On the other hand, in the region to the left of Line OP (the line inclusive), although the spontaneous chain reaction occurs, the inhibition of the formation of coarse silicon carbide is not effective due to the low silica content.

Thus, with the composition within the tetragon OPQR, the mixture of the raw materials brings about the spontaneous chain reaction to quickly complete the reaction while inhibiting the formation of coarse particles such that the desired minute and active powder is obtained. As the proportion of the silica component is increased within the region of the tetragon, the effect of silica tends to become more remarkable and imparts an improved fineness to the product.

In the practice of the invention, therefore, with the above points taken into consideration, the mixing ratio may be selected within the above region according to the intended applications for the product.

The raw materials are mixed thoroughly in a usual method, filled in an appropriate heat refractory reactor and heated in an oxidizing atmosphere. In this case, the spontaneous chain reaction is brought about irrespective of the bulk density after charging the mixture of the raw materials and since the particle size of the product powder can be easily controlled down to the minute fineness by adjusting the silica component in accordance with the present invention, it is advantageous to make the bulk density as high as possible from a productivity point of view.

If the oxygen content of the heated atmosphere is less than about 0.3% by volume, the spontaneous chain reaction is not induced, whereas a strongly oxidizing atmosphere having an oxygen content exceeding about 35% by volume will unfavorably increase the problems associated with the oxidation. As long as the atmosphere contains about 0.3 to 35% by volume of oxygen, it can be made up of air, as well as include a reducing or inert gas such as carbon monoxide, carbon dioxide or argon, or be under reduced pressure, e.g., under a low vacuum of 11 mg Hg or higher. The heat refractory reactor may be an open electric oven, a gas oven or an ordinary industrial refractory oven for calcining refractories.

The heat process of the present invention must be conducted until the mixture of the raw materials reaches a temperature high enough to induce the spontaneous chain reaction. That temperature depends on the particle size of the raw materials, the mixing ratio, the mixing conditions, the size of a batch of the mixture, the size of the refractory reactor, the oxygen content of the atmosphere, the heat-up rate, etc., but usually falls into a range of about 800 to 1,450° C. and preferably 1,000 to 1,300° C.

The temperature at which the spontaneous chain reaction is induced can be determined easily by a preliminary experiment and it is preferred to set the reactor temperature a little higher than that temperature. The time required for heating is usually within 10 hours including heat-up time, and a longer time is necessary as the oxygen content of the atmosphere decreases.

The product thus-obtained by the induction of the spontaneous chain reaction according to the present invention can be powdered easily without any special mechanical pulverization and most of the product is in the form of powder of a particle size of about 500 μm or less by appearance. By use of an ordinary grinder such as a ball mill, an oscillating mill, etc., the obtained product is readily pulverized, thus giving a fine powder of a particle size of about 0.9 to 0.005 μm easily. The reduction in particle size becomes easier as the particle size of the carbon raw material is smaller and the proportion of the silica increases.

The product obtained by the induction of the spontaneous chain reaction according to the present invention is composed of silicon carbide chiefly of $\beta$-crystals analyzed by X-ray crystallography and a purity of 90% or higher can be attained without difficulty.

The present invention will now be explained in more detail by reference to the following examples. These examples are provided for illustration only and one skilled in the art will understand that modifications can be made therein without departing from the spirit and scope of the present invention.

EXAMPLE 1

3.12 kg of commercially available carbon black (purity 98.4 weight %, "Carbon Black", a product of Mitsubishi Chemical Industries, Ltd.) of an average particle size of 0.05 μm, 5.36 kg of commercially available metallic silicon powder (purity 94.6 weight %, "Metallic Silicon", a product of Ohsawa Tatsu K.K.) of an average particle size of 77 μm and 0.58 kg of silica powder obtained as a by-product from the production of phosphate fertilizers (purity 98.5 weight %) of an average particle size of about 0.08 μm were mixed. The composition of the mixture was C: 51.9 mol%, Si: 46.2 mol% and $SiO_2$: 1.9 mol% as plotted No. 1 in the FIG.

Water was added to the mixture in an amount of 35 parts by weight per 100 parts by weight of the mixture, kneaded and filled in a heat refractory cylindrical reactor having an inner diameter of 260 mm and a height of 300 mm and a lid was placed lightly thereon. The refractory cylindrical reactor was then heated in Siliconit box type electric oven, that is, in an air atmosphere ($O_2$: 20 volume %, $N_2$: 80 volume %) at a heat-up rate of about 300° C. per hour. When the temperature reached about 1,060° C., remarkable fuming indicative of the induction of the spontaneous chain reaction was observed and this phenomenon continued for about a minute or two. Thereafter, the electric power was cut off to allow the reactor to cool. About 20 hours later, the heated product was taken out. Although its surface was a little whitened to a depth of about 5 mm due to the oxidation, the uniform yellowish green color throughout the inside clearly showed that it was composed of high quality silicon carbide.

Apparently, the product had not been sintered at all, and was readily crushed to a powder of an apparent particle size of 200 μm or less just by smashing between two finger tips. It was reduced to a powder of an average particle size of 0.5 μm merely by grinding in a laboratory crusher. By the X-ray analysis of the obtained powder, most of the powder was identified as $\beta$-crystals of silicon carbide, and the purity was found 96.5 weight % by a usual wet chemical analysis.

For comparison, according to a process disclosed in U.S. Pat. No. 4,117,096, carbon powder and silicon powder were used as the raw materials without silica powder, and the other experimental conditions were the same as the above, to obtain a product. Although the product had the same appearance and purity, it gave a rather coarse average particle size of 4.0 μm when ground under the same conditions. Thus, it was demonstrated that the present invention enables an easier production of minute and active silicon carbide fine powder.

EXAMPLE 2

In a similar manner as in Example 1, the same mixture as in Example 1 was filled in a heat refractory reactor, and a lid was placed lightly thereon. The reactor was then embedded in coke breeze and calcined in a tunnel kiln for calcining refractories having a heating zone of about 1,230° C. for about 40 hours from loading to unloading. The atmosphere in the kiln was $O_2$: 3.2, CO: 0, $CO_2$: 10.8, $H_2O$: 13.9 and $N_2$: 77.0% by volume. Apparently, the heated product thus-obtained had an oxidized surface of less thickness. The crystal properties were the same as in Example 1. The purity improved to 97.7%.

EXAMPLE 3

In a similar manner as in Example 1, the same mixture as in Example 1 was filled in a heat refractory reactor and a lid was placed thereon lightly. The reactor was then quickly put into an electric oven already kept at 1,350° C. inside, and heated rapidly. After 1 hour or so, a remarkable fuming was observed, the reactor was immediately removed and embedded in coke breeze for forced cooling. The heated product thus obtained showed substantially no oxidized surface layer and assumed a yellowish green color entirely. The fineness of the particles was the same as those in Examples 1 and 2 and the purity was further improved, i.e., 99.2%.

EXAMPLE 4

The same procedures as in Example 1 were repeated except that the mixing ratio of the raw materials was C: 53.7 mol%, Si: 42.6 mol% and $SiO_2$: 3.7 mol% as plotted No. 2 in the FIG. The temperature at which the fuming started was about 1,080° C. and an electric power was cut off when the temperature reached about 1,120° C. A similar appearance and purity to those in the preceding examples were obtained. When ground in a laboratory crusher under the same conditions, it was further reduced to a powder of an average particle size of 0.2 μm.

While the invention has been described in detail and with reference to specific embodiments thereof, it will be apparent to one skilled in the art that various changes and modifications can be made therein without departing from the spirit and scope thereof.

What is claimed is:

1. A process for producing a β-silicon carbide fine powder which comprises mixing carbon powder having a particle size of 20 μm or less, silicon powder and silica powder to form a mixture whose composition falls within the region defined by the lines connecting O (C: 62.4, Si: 37.4, $SiO_2$: 0.2), P (C: 34.9, Si: 64.9, $SiO_2$: 0.2), Q (C: 50, Si: 41, $SiO_2$: 9) and R (C: 68, Si: 23, $SiO_2$: 9) of the FIG. The quantities of C, Si and $SiO_2$ of O, P, Q and R being expressed in Mol%, filling the mixture in a heat refractory reactor and heating it is an oxidizing atmosphere having an oxygen content of about 0.3 to 35% by volume to a temperature of about 800 to 1,450° C. to induce a spontaneous chain reaction and effect the formation of β-silicon carbide.

2. The process of claim 1, wherein said silicon powder has a particle size up to about 200 μm.

3. The process of claim 1, wherein said silica has a particle size of about 20 μm or less.

4. The process of claim 1, wherein said silica is an amorphous silica or white carbon.

5. The process of claim 1, wherein said silica is quartzite or siliceous sand.

6. The process of claim 1, wherein said powders are mixed in the following amounts:
carbon: 51.9 mol%
silicon: 46.2 mol%
silica: 1.9 mol%.

7. The process of claim 1, wherein said powders are mixed in the following amounts:
carbon: 53.7 mol%
silicon: 42.6 mol%
silica: 3.7 mol%.

* * * * *